United States Patent
Weinshenker

[11] 3,904,649
[45] Sept. 9, 1975

[54] PROCESS FOR PRODUCING SUBSTITUTED IODOLACTONE

[75] Inventor: Ned M. Weinshenker, Palo Alto, Calif.

[73] Assignee: Alza Corporation, Palo Alto, Calif.

[22] Filed: Nov. 17, 1971

[21] Appl. No.: 199,719

[52] U.S. Cl. .............................................. 260/343.3
[51] Int. Cl.² ...................................... C07D 307/77
[58] Field of Search ................................ 261/343.3

[56] References Cited
OTHER PUBLICATIONS
Corey et al., J.A.C.S. Vol. 91, pp. 5675–5677, 1969.
Corey et al., J.A.C.S. Vol. 92, pp. 397–398.
Corey et al., J.A.C.S. Vol. 93, pp. 1491–1494.

*Primary Examiner*—Donald G. Daus
*Assistant Examiner*—Anne Marie T. Tighe
*Attorney, Agent, or Firm*—Paul L. Sabatine; Steven D. Goldby; Edward L. Mandell

[57] ABSTRACT

A novel process for preparing a 2α, 4α-dihydroxy-3β-iodo-cyclopentane γ-lactone of the formula

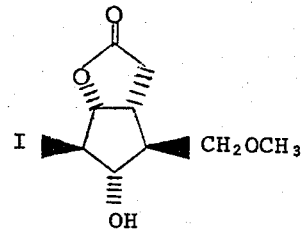

wherein the process comprises reacting in a single reaction vessel a ketone of the formula

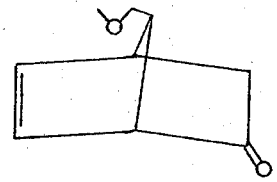

with an oxidizing agent in an alkaline media, acidifying the alkali media and quenching the oxidizing agent, alkalinizing the reaction media and treating it with an alkali iodide and iodine to yield the desired γ-lactone. The γ-lactone is useful for preparing therapeutically valuable prostaglandins.

1 Claim, No Drawings

PROCESS FOR PRODUCING SUBSTITUTED IODOLACTONE

BACKGROUND OF THE INVENTION

Field of the Invention

The present invention relates to a novel and useful process for preparing (±)2-oxa,3-oxo,6-exo-methoxymethyl, 7-endo-hydroxy,8-exo-iodo-cis-bicyclo(3.3.0) octane of Formula 1 as follows:

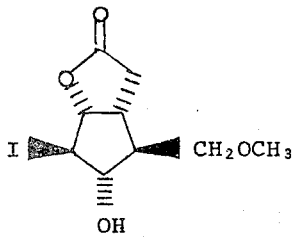

Formula 1

The γ-lactone is prepared in situ, in a single reaction vessel by first reacting the bicyclic ketone 7-synmethoxymethyl-2-norbornen-5-one of Formula 2 as follows:

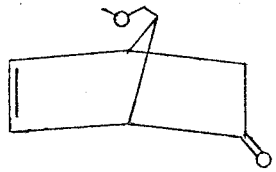

Formula 2 with the oxidizing agent hydrogen peroxide in an alkaline media, second, neutralizing the alkaline media with an acid and quenching the excess oxidizing agent with a reducing agent, then realkalinizing the reaction media and adding thereto an alkali iodide and iodine to yield the γ-lactone of Formula 1. The γ-lactone is useful for preparing by art known chemical methods therapeutically useful prostaglandins.

Description of the Prior Art

The prostaglandins are a naturally occurring group of long chain, unsaturated, oxygenated fatty acids possessing useful therapeutic properties. The prostaglandins' structure and properties are described in Prostaglandins, Progress in the Chemistry of Fats and Other Lipids, Vol. IX, Part 2, pages 231 to 273, 1968, Pergamon Press, and their properties broadly include modifiers of smooth muscle activity, regulation of gastric secretion, lowering of blood pressure, stimulation of the reproductive system, and the like. The chemical art, because of the prostaglandins valuable properties, has made available chemical synthesis for preparing the prostaglandins. These synthesis are reported in J. Am. Chem. Soc., Vol. 91, pages 5675 to 5677, 1969; and ibid, Vol. 92, pages 397 to 398, 1970.

In these reported chemical synthesis of intermediate leading to prostaglandins, certain disadvantages were encountered by the prior art in the chemical reactions for synthesizing useful prostaglandins; mainly in the synthesis of the key intermediate (±)2-oxa,3-oxo,6-exo-methoxymethyl,7-endo-hydroxy,8-exo-iodo-cis-bicyclo(3.3.0) octane, the compound of Formuls 1. One of the encountered disadvantages was the need to isolate the various intermediate compound produced in the independent reactions leading to the compound of Formula 1. For example, in the reported synthesis, the syn-bicyclic ketone of Formula 2 is oxidized to produce a lactone of Formula 3 as follows:

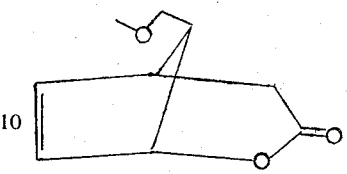

Formula 3

The lactone, 2-oxa-3-oxo-$\delta^5$-8-syn-methoxymethyl-bicyclo-(3.2.1) octane was isolated, usually as the alkali salt, hydrolyzed, and acidified at low pH to afford the free hydroxy acid, (±)3α-carboxymethyl,4-β-methoxymethyl-5-α-hydroxycyclopent-1-ene. The hydroxy acid was then subjected to iodolactonization to yield the desired compound of Formula 1. The synthesis of the γ-lactone of Formula 1 as practiced prior to this invention required expensive reactants, a need for difficult isolation steps and tedious work-up of the reaction media. Moreover, it was generally not suitable for large scale production of this key intermediate. Thus, in view of the foregoing presentation, it can be seen that the art needs a novel and improved chemical synthesis for preparing (±)2-oxa,3-oxo,6-exo-methoxymethyl,7-endo-hydroxy,8-exo-iodo-cis-bicyclo(3.3.0) octane that is useful for preparing pharmacologically valuable prostaglandins.

OBJECTS OF THE INVENTION

Accordingly, it is an object of the present invention to make available to the art a novel chemical process for preparing (±)2-oxa,3-oxo,6-exo-methoxymethyl,7-endohydroxy,8-exo-iodo-cis-bicyclo(3.3.0) octane that essentially overcomes the disadvantages encountered by the prior art.

It is a further object of the present invention to provide a novel process for preparing (±)2-oxa,3-oxo,6-exo-methoxymethyl,7-endo-hydroxy,8-exo-iodo-cis-bicyclo-(3.3.0) octane that can be used in art known chemical synthesis for producing therapeutic useful prostaglandins.

Still a further object of the invention is to provide a process for preparing (±)2-oxa,3-oxo,6-exo-methoxymethyl,7-endo-hydroxy,8-exo-iodo-cis-bicyclo(3.3.0) octane wherein the process does not require isolation procedures, extensive work-up and does not tend to produce unwanted products.

Yet still a further object of the invention is to simplify the multi-reaction step process of the prior art for preparing (±)2-oxa,3-oxo,6-exo-methoxymethyl,7-endo-hydroxy,8-exo-iodo-cis-bicyclo(3.3.0) octance by providing a process for synthesizing the compound that is continuous, uninterrupted, and that can be performed in a single reactor vessel.

Yet another object of the invention is to provide a process for preparing (±)2-oxa,3-oxo,6-exo-methoxymethyl,7-endo-hydroxy,8-exo-iodo-cis-bicyclo(3.3.0) octane in a single reaction vessel wherein the synthesis is reproducible, easy to carry out, is not subjected to decreased yields of the desired product and is acceptable for large scale preparation of the γ-lactone.

These and other objects of the invention will be readily apparent to those skilled in the art upon a study of the present disclosure and the accompanying claims.

SUMMARY OF THE INVENTION

This invention concerns both a novel and useful improved process for preparing (±)2-oxa,3-oxo-methoxymethyl,7-endo-hydroxy,8-exo-iodo-cis-bicyclo(3.3.0) octane by reacting in a single reaction vessel 7-syn-methoxymethyl-2-norbornen-5-one with hydrogen peroxide under alkaline conditions, slightly acidifying the reaction with acid and quenching the excess hydrogen peroxide with a reducing agent, realkalizing the reaction and iodolactonizing it with an alkali iodide and iodine to yield the desired product. The product is useful for preparing prostaglandins by known chemical processes.

DETAILED DESCRIPTION OF THE INVENTION

In attaining the objects and advantages of this invention, it has now been unexpectedly found that a novel and improved process for preparing (±)2-oxa,3-oxo,6-exo-methoxymethyl,7-endo-hydroxy,8-exo-iodo-cis-bicyclo(3.3.0)octane, Formula 1, can be made available to the act as represented by the following general equation:

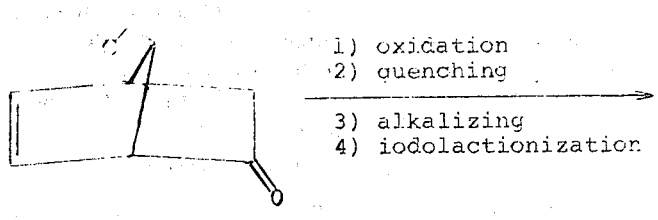 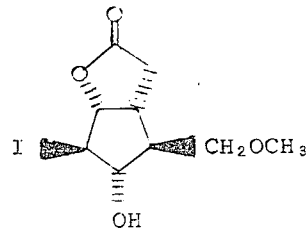

1) oxidation
2) quenching
3) alkalizing
4) iodolactionization

The novel reaction is carried out by intimately contacting and reacting the reactants in a single reaction vessel. That is, this invention makes possible the direct synthesis of (±)2-oxa,3-oxo,6-3xo-methoxymethyl,7-endo-hydroxy,8-exo-iodo-cis-bicyclo(3.3.0) octane without the need to isolate any intermediate compounds.

The novel reaction is usually carried out by reacting stoichiometric amounts, or an excess of the reactants under normal atmospheric pressure or at elevated pressure up to 5 atmospheres. The reaction is typically performed by first mixing the starting bicyclic ketone of Formula 2 dissolved in an inert organic solvent with an aqueous alkali hydoxide solution at a temperature of 0° to 10°C to produce an alkaline mixture with a pH of about 8 to 14. Next, the ketone is treated in situ with an oxidizing agent, for example hydrogen peroxide of 30% concentration, and the oxidation reaction allowed to proceed for about ½ hour to 4 hours. At the end of this time, the reaction media comprised of an inert organic phase and an aqueous phase is separated and the aqueous phase acidified with an acid to a pH of about 5 to 7. Then, to the acidified phase is added a reducing agent for quenching the unused oxidizing agent as indicated by conventional starch-iodide test paper. The pH of the aqueous phase is readjusted to about 7 to 10, generally with an inert alkali salt of a weak acid, or the like, and a solution comprised of an alkali iodide and iodine in the ratio of about 3 to 1 is added to the same reaction vessel. The iodolactonization is allowed to proceed for about 15 to 25 hours at a temperature of about 0° to 15°C. The product is recovered by decolorizing the excess iodine with a reducing agent, saturating the reaction media with a water soluble salt of a strong base and a weak acid to assist the extraction of the product from the reaction medium with an inert solvent. Finally, the solvent is dried and evaporated to yield the crystalline, racemic compound of Formula 1.

Exemplary of alkali hydroxides suitable for the above described reaction are sodium hydroxide, potassium hydroxide, lithium hydroxide and the like. Representative reducing agents include sodium sulfite, potassium sulfite, lithium sulfite, calcium sulfite, ferrous chloride, ferrous sulfate, and the like. Acid suitable for acidifying for the present purpose include mineral acids such as hydrogen chloride, sulfuric acid, acetic acid, oxalic acid and the like. Typical of suitable salts for producing an alkaline medium include sodium bicarbonate, potassium bicarbonate, potassium carbonate, sodium acetate and the like. Representative of water soluble alkali salts include sodium potassium tartrate, potassium tartrate, sodium bicarbonate, sodium carbonate, sodium oxalate, and the like. Suitable alkali iodides include potassium iodide, sodium iodide, lithium iodide and the like. Exemplary of a suitable solvent is a solvent that does not adversely affect the reaction or the product such as diethyl ether, tetrahydrofuran, methyl ethyl ether, dioxane, benzene, ethylene chloride, methylene chloride, and the like.

The followind example is representative of embodiments of the present invention and this example is not to be construed as limiting as these and other embodiments will be readily apparent to those versed in the art in the light of the present disclosure and the accompanying claims.

EXAMPLE 1

Preparation of (±)2-oxa,3-oxo,6-exo-methoxymethyl,7-endo-hydroxy,8-exo-iodo-cis-bicyclo(3.3.0) octane. A dry, three necked flask equipped with a thermometer, a stirrer and an inlet-outlet port was charged with 100 g, 0.66 moles, of 7-sys-methoxymethyl-2-norbornen-5-one, about 85% pure, dissolved in 100 ml of diethyl ether, and the flask cooled in a standard ice bath. Next, a solution of sodium hydroxide, 26.4 g, 0.66 moles, in 100 ml of water is added to the flask with constant stirring to mix the ingredients. To the flask is then added dropwise with rapid stirring 75 ml of 30% hydrogen peroxide while maintaining the temperature of the reactants below 25°C. After the addition of the hydrogen peroxide, the stirring is continued for an additional ½ hour. Next, the reaction medium is allowed to separate into an ether phase and an aqueous phase separated therefrom, and the aqueous phase extracted with 100 ml of ether, and the ether extracts discarded. The aqueous phase is then acidified with concentrated hydrochloric acid to a pH of about 6 and the unused, excess hydrogen peroxide is quenched by adding sodium sulfite to the flask. The neutralization of the hydrogen peroxide is indicated by using standard starch iodide test paper. Next, the pH of the aqueous phase is adjusted with solid sodium bicarbonate to 7.5 as determined by using a conventional pH meter. To this is then added a solution comprised of 400 g of iodine and 800 g of potassium iodide in 600 ml of water and the reaction continued in the same reaction vessel with constant stirring at 0° to 5°C for about 18 hours. The product is then recovered by decolorizing the reaction mixture with sodium sulfite, saturating the aqueous medium by adding solid sodium potassium tartrate until it begins to precipitate, and then extracting this medium with methylene chloride. The extraction procedure is repeated, and the extract combined in a single flask. Then, the extracts are dried over anhydrous magnesium sulfate, filtered and the extraction solvent evaporated at room temperature with the assist of in-house vacuum, to yield the desired iodolactone.

The compound produced by this invention has art known utility, for example, (±)2-oxa,3-oxo,6-exo-methoxymethyl,7-endo-hydroxy,8-exo-iodo-cis-bicyclo(3.3.0) octane is used in the stereo-controlled synthesis for the production of pharmaceutically active prostaglandins as set forth in J. Am. Chem. Soc., Vol. 91, pages 5675 to 5677, 1969, and ibid, Vol. 92, pages 397 to 398, 1970. The compound is used in the reaction listed in the former reference as steps 4 through 16 inclusive to yield prostaglandins such as $PGE_2$ (11α,15-(S)-dihydroxy-9-oxo-5-cis,13-trans-prostadienoic acid) and $PGF_2$ (9α,11α,15(S)-trihydroxy-5-cis,13-trans-prostadienoic acid). Both of these prostaglandins are useful as therapeutics, such as, for inducing labor, the stimulation of smooth muscles, for the termination of pregnancy, and other art known uses.

As is evident from the above discussion and example, it is readily apparent that this invention makes available to the art an unobvious process for producing (±)2-oxa,3-oxo,6-exo-methxymethyl,7-endo-hydroxy,8-exo-iodo-cis-bicyclo(3.3.0) octane in a continuous, direct reaction, in a single reaction vessel that can be successfully used for synthesizing valuable prostaglandins without being subject to the problems associated with the prior art. And, while various illustrative embodiments of the invention have been described with particularity, it will be understood that various modifications will be apparent and can be readily made by those skilled in the art without departing from the scope and the spirit of the invention.

I claim:

1. A process for preparing (±)2-oxa, 3-oxo,6-exo-methoxymethyl,7-endo-hydroxy,8-exo-iodo-cis-bicyclo-(3.3.0) octane wherein the process consists essentially of oxidizing 7-syn-methoxymethyl-2-norbornen-5-one with hydrogen peroxide in an alkaline medium for about ½ hour to 4 hours, acidifying the medium to a pH of about 5 to 7 and quenching the unused hydrogen peroxide with a reducing agent selected from the group consisting of sodium sulfite, potassium sulfite, lithium sulfite, calcium sulfite, ferrous chloride, and ferrous sulfate, realkalizing the medium and treating it with a solution comprised of an alkali iodide and iodine in the ratio of about 3 to 1, at a temperature of about 0° to 15°C, decolorizing the unreacted solution with a reducing agent, and extracting the decolorized solution with an inert organic solvent to yield the γ-lactone, and wherein the process is continuous and performed in a single reaction vessel for producing the γ-lactone.

* * * * *